US009586756B2

(12) United States Patent
O'Riordan et al.

(10) Patent No.: US 9,586,756 B2
(45) Date of Patent: Mar. 7, 2017

(54) WEIGHING SYSTEM FOR A FRONT-END-LOADING WASTE-HAULING VEHICLE

(71) Applicant: Advanced Manufacturing Control Systems Limited, Crecora, Co. Limerick (IE)

(72) Inventors: Gary O'Riordan, Co. Limerick (IE); Thomas Lawlor, Limerick (IE); Cornelius Broderick, Co. Limerick (IE); Eamon Hynes, Limerick (IE)

(73) Assignee: ADVANCED MANUFACTURING CONTROL SYSTEMS LIMITED, Crecora (IE)

(*) Notice: Subject to any disclaimer, the term of this patent is extended or adjusted under 35 U.S.C. 154(b) by 0 days.

(21) Appl. No.: 14/698,971

(22) Filed: Apr. 29, 2015

(65) Prior Publication Data

US 2015/0307274 A1 Oct. 29, 2015

Related U.S. Application Data

(60) Provisional application No. 61/985,737, filed on Apr. 29, 2014.

(51) Int. Cl.

| | |
|---|---|
| ***G01G 19/00*** | (2006.01) |
| ***G01G 19/08*** | (2006.01) |
| ***B65F 3/00*** | (2006.01) |
| ***B65F 3/04*** | (2006.01) |
| *B65F 3/02* | (2006.01) |

(52) U.S. Cl.

CPC ........ *B65F 3/041* (2013.01); *B65F 2003/022* (2013.01)

(58) Field of Classification Search

CPC combination set(s) only.
See application file for complete search history.

(56) References Cited

U.S. PATENT DOCUMENTS

| | | | | |
|---|---|---|---|---|
| 4,042,049 A | | 8/1977 | Reichow | |
| 4,239,437 A | * | 12/1980 | Naab | B65F 3/046 414/408 |
| 5,178,226 A | | 1/1993 | Bowman | |

(Continued)

FOREIGN PATENT DOCUMENTS

WO 9704289 A1 2/1997

*Primary Examiner* — Yonel Beaulieu
(74) *Attorney, Agent, or Firm* — Dickinson Wright PLLC

(57) ABSTRACT

A weighing system for a waste-hauling vehicle having a front end loader with at least two arms for lifting a waste container, the weighing system comprising: an extensometer mounted on at least one arm of the front end loader, the extensometer secured to separate extensometer mounts so that the extensometer is operative to detect deflections in the front end loader arm in response to loads of varying weights; and a vehicle data hub in communication with the extensometer, the vehicle data hub operative to receive inputs from the extensometer and determine therefrom: (i) the weight of a waste container containing waste as the waste container is lifted by the front end loader for emptying into a waste receptacle on the vehicle; (ii) the weight of the waste container as it is lowered by the front end loader after the waste container has been emptied into the waste receptacle on the vehicle; and (iii) the net weight of the waste that was contained in the container.

17 Claims, 11 Drawing Sheets

(56) References Cited

U.S. PATENT DOCUMENTS

| | | | | |
|---|---|---|---|---|
| 5,190,116 | A | 3/1993 | Reichow | |
| 5,195,418 | A | 3/1993 | Smith | |
| 5,209,313 | A | 5/1993 | Brodrick | |
| 5,245,137 | A | 9/1993 | Bowman | |
| 5,703,333 | A | 12/1997 | Wegner | |
| 5,917,159 | A | 6/1999 | Kostiuk | |
| 2006/0064264 | A1 * | 3/2006 | Pottebaum | G01G 19/12 702/101 |
| 2012/0285750 | A1 | 11/2012 | Hynes et al. | |
| 2014/0060939 | A1 * | 3/2014 | Eppert | E02F 3/342 177/1 |

* cited by examiner

WEIGHING SYSTEM FOR A FRONT-END-LOADING WASTE-HAULING VEHICLE

CROSS-REFERENCE TO RELATED APPLICATIONS

The present application is related to, and claims the benefit of priority from, U.S. Provisional Application Ser. No. 61/985,737, filed 29 Apr. 2014, the disclosure of which is incorporated by reference herein in its entirety.

TECHNICAL FIELD

This invention relates generally to weighing devices in front-end-loading ("FEL") type waste-hauling vehicles.

BACKGROUND

Vehicle-mounted weighing devices, such as, for instance, disclosed in U.S. Pat. No. 4,042,049 (Reichow, et al.) and U.S. Pat. No. 5,190,116 (Reichow), have in the past been used to measure vehicle loads. Such load-measuring devices have been manufactured in various forms and configurations and, in use, are typically positioned on a structural member of the vehicle such as an axle or a structural part of the suspension system. An onboard weighing system permits convenient measurement of loads at any time, without the necessity of using a conventional scale. It also prevents accidental overloads and the possible fines and other inconvenience associated therewith, while insuring that the vehicle is loaded substantially to its permitted capacity whenever possible.

Conventional onboard weighing systems, including the system shown in U.S. Pat. No. 4,042,049, are typically subject to inaccurate or fluctuating results, due to twisting and possibly other movements of the weighing device caused by normal movement of the vehicle. Such movements are not indicative of vehicle load, but do have an effect on the weighing system. Furthermore, conventional vehicle-mounted weighing devices are easily imprecisely positioned, which in turn can result in poor performance of the weighing device. Still other drawbacks associated with existing vehicle-mounted weighing systems include expensive truck modifications, ongoing maintenance and re-calibration, data acquisition and driver dependency. Hence, there continues to be a need for a vehicle-mounted weighing system which addresses all or at least some of the foregoing drawbacks.

SUMMARY OF THE DISCLOSURE

There is disclosed herein a weighing system for a waste-hauling vehicle having a front end loader, the weighing system comprising: At least one extensometer mounted on at least one arm of the front end loader, the extensometer secured to separate extensometer mounts so that the at least one extensometer is operative to detect deflections in the front end loader arm in response to loads of varying weights; and a vehicle data hub in communication with the extensometer, the vehicle data hub operative to receive inputs from the extensometer and determine therefrom: (i) the weight of a waste container containing waste as the waste container is lifted by the front end loader for emptying into a waste receptacle on the vehicle; (ii) the weight of the waste container as it is lowered by the front end loader after the waste container has been emptied into the waste receptacle on the vehicle; and (iii) the net weight of the waste that was contained in the container.

Per one feature, there is further provided a tilt sensor disposed on at least one arm of the front end loader, the tilt sensor in communication with the vehicle data hub, and the tilt sensor operative to measure the angular position of the at least one arm of the front loader through its range of motion. The vehicle data hub is further operative to receive inputs from the tilt sensor and determine therefrom the height of the at least one arm of the front loader through its range of motion.

Per another feature, there may also be provided a GPS receiver, and a computer operative to determine a GPS location for the vehicle and to create a record comprising at least the net weight of the waste that was contained in the container as determined by the vehicle data hub, as well as the GPS location of the waste-hauling vehicle determined for the location at which the net weight determination was made.

In one embodiment, an extensometer is mounted on each of two arms of the front end loader. Each extensometer is secured to separate extensometer mounts so that each extensometer is operative to detect deflections in the front end loader arm in response to loads of varying weights.

Each of the one or more extensometers is, in one embodiment, positioned on a portion of the front end loader arm which is characterized as being substantially horizontally oriented when the front end loader arm is in a lowered position relative to the vehicle.

In another embodiment, two extensometers are mounted opposite each other on upper and lower surfaces of the same arm of the front end loader, each extensometer is secured to separate extensometer mounts so that each extensometer is operative to detect deflections in the front end loader arm in response to loads of varying weights.

In yet another embodiment, two extensometers are mounted in longitudinally spaced-apart locations on the same at least one arm of the front end loader. Each extensometer is secured to separate extensometer mounts so that each extensometer is operative to detect deflections in the front end loader arm in response to loads of varying weights.

According to one embodiment, the at least one extensometer mounted on at least one arm of the front end loader is installed by the steps of: providing a positioning jig having a principal length extending between first and second ends, the first end defining a frame of reference for orienting the jig on the arm of a front end loader, and the jig having removably connected thereto along the principal length each of a unitary mount for an extensometer and a pair of mounts for a cover; placing the jig on the arm of a front end loader so that the first end is positioned in a predefined location relative to a known location on the front end loader arm; securing the cover mounts and the unitary extensometer mount to the front end loader arm; disconnecting the positioning jig from each of the cover mounts and the unitary extensometer mount; cutting the unitary extensometer mount to define two completely separate extensometer mounts; securing an extensometer to the separate extensometer mounts so that the extensometer is operative to detect deflections in the front end loader arm in response to loads of varying weights; and positioning a cover over the extensometer and connecting the cover to each of the cover mounts.

Per one feature, the front end loader arm includes a dump position stop-plate and the first end of the jig comprises an end plate. The step of placing the jig on the arm of a front end loader so that the first end is positioned in a predefined location relative to a known location on the front end loader arm comprises placing the jig so that the first-end end-plate abuts the dump position stop-plate.

Per another feature, the front end loader arm includes a plug weld hole proximate a stopper buffer area of the front end loader arm, and the step of placing the jig on the arm of a front end loader so that the first end is positioned in a predefined location relative to a known location on the front end loader arm comprises placing the jig so that the first end is positioned a predefined distance from the plug weld hole.

Per a still further feature, the unitary extensometer mount comprises first and second portions each having a first thickness. The first and second portions are spaced apart from each other by an intermediate portion having a second thickness that is less than the first thickness, the intermediate portion being positioned between the first and second portions so as to leave a gap beneath the intermediate portion and between the first and second portions.

According to yet another feature, the step of cutting the unitary extensometer mount to define two completely separate extensometer mounts comprises cutting the unitary extensometer mount so that there is an approximately 10 cm gap between the separate extensometer mounts.

Per a further feature, one of the extensometer or the extensometer mounts comprises a mounting surface of a first material, and the other of the extensometer or the extensometer mounts includes one or more projections of a harder material than the first material, such that, when the extensometer is secured to the extensometer mounts with sufficient force, the projections create corresponding indentations in the first material to register the extensometer and the extensometer mounts in a zero tolerance relationship.

Per another feature, the extensometer is secured to the extensometer mounts via threaded fasteners, and one or more washers are provided between the extensometer and the threaded fasteners. The one or more washers may, in one form, be NORD-LOCK washers.

According to another feature, the extensometer is secured to the extensometer mounts via threaded fasteners, and a thread locking adhesive is applied to the threaded fasteners.

The method of installing each at least one extensometer on at least an arm of the front end loader may be employed in a weighing system other than as disclosed. Accordingly, the present disclosure also comprehends a method of installing a weighing device on one or more arms of a waste-hauling vehicle having a font-end loader, wherein the method comprises the following steps:

providing a positioning jig having a principal length extending between first and second ends, the first end defining a frame of reference for orienting the jig on the arm of the front end loader, and the jig having removably connected thereto along the principal length each of a unitary mount for an extensometer and a pair of mounts for a cover;

placing the jig on the arm of the front end loader so that the first end is positioned in a predefined location relative to a known location on the front end loader arm;

securing the cover mounts and the unitary extensometer mount to the front end loader arm;

disconnecting the positioning jig from each of the cover mounts and the unitary extensometer mount;

cutting the unitary extensometer mount to define two completely separate extensometer mounts;

securing an extensometer to the separate extensometer mounts so that the extensometer is operative to detect deflections in the front end loader arm in response to loads of varying weights; and positioning a cover over the extensometer and connecting the cover to each of the cover mounts.

Where each front end loader arm includes a dump position stop-plate, the first end of the jig comprises an end plate, and the step of placing the jig on the arm of a front end loader so that the first end is positioned in a predefined location relative to a known location on the front end loader arm comprises placing the jig so that the first-end end-plate abuts the dump position stop-plate.

Where each front end loader arm includes a plug weld hole proximate a stopper buffer area of the front end loader arm, the step of placing the jig on the arm of a front end loader so that the first end is positioned in a predefined location relative to a known location on the front end loader arm comprises placing the jig so that the first end is positioned a predefined distance from the plug weld hole.

In one embodiment, the step of cutting the unitary extensometer mount to define two completely separate extensometer mounts comprises cutting the unitary extensometer mount so that there is an approximately 10 cm gap between the separate extensometer mounts.

Per one feature, the unitary extensometer mount comprises first and second portions each having a first thickness, the first and second portions being spaced apart from each other by an intermediate portion having a second thickness that is less than the first thickness, and the intermediate portion is positioned between the first and second portions so as to leave a gap beneath the intermediate portion and between the first and second portions. Per this feature, the step of cutting the unitary extensometer mount to define two completely separate extensometer mounts may further comprise cutting the intermediate portion so that there is an approximately 10 cm gap between the separate extensometer mounts.

According to another feature, the extensometer is positioned on a portion of the front end loader arm which is characterized as being substantially horizontally oriented when the front end loader arm is in a lowered position relative to the vehicle.

Per still another feature, one of the extensometer or the extensometer mounts comprises a mounting surface of a first material, and the other of the extensometer or the extensometer mounts includes one or more projections of a harder material than the first material, such that, when the extensometer is secured to the extensometer mounts with sufficient force, the projections create corresponding indentations in the first material to register the extensometer and the extensometer mounts in a zero tolerance relationship.

Per a still further feature, the extensometer is secured to the extensometer mounts via threaded fasteners, and wherein further one or more washers are provided between the extensometer and the threaded fasteners. According to this feature, the one or more washers may be NORD-LOCK washers.

According to another feature, the extensometer is secured to the extensometer mounts via threaded fasteners, and a thread locking adhesive is applied to the threaded fasteners.

It will also be understood from this disclosure that the manner of securing an extensometer to mounts on the waste-hauling vehicle may be other than as described herein while still employing certain attributes of the invention disclosure. Thus, for instance, the present invention comprehends one of an extensometer or extensometer mounts comprising a mounting surface of a first material, and the other of the extensometer or the extensometer mounts includes one or more projections of a harder material than the first material, such that, when the extensometer is secured to the extensometer mounts with sufficient force, the projections create corresponding indentations in the first material to register the extensometer and the extensometer mounts in a zero tolerance relationship. Alternatively, or in addition, the extensometer may be secured to the extensometer mounts via threaded fasteners, with one or more washers provided between the extensometer and the threaded fasteners. According to this feature, the one or more washers may be NORD-LOCK washers. Alternatively, or in addition, the extensometer may be secured to the extensometer mounts via threaded fasteners, and a thread locking adhesive is applied to the threaded fasteners.

WRITTEN DESCRIPTION

Figure 1:
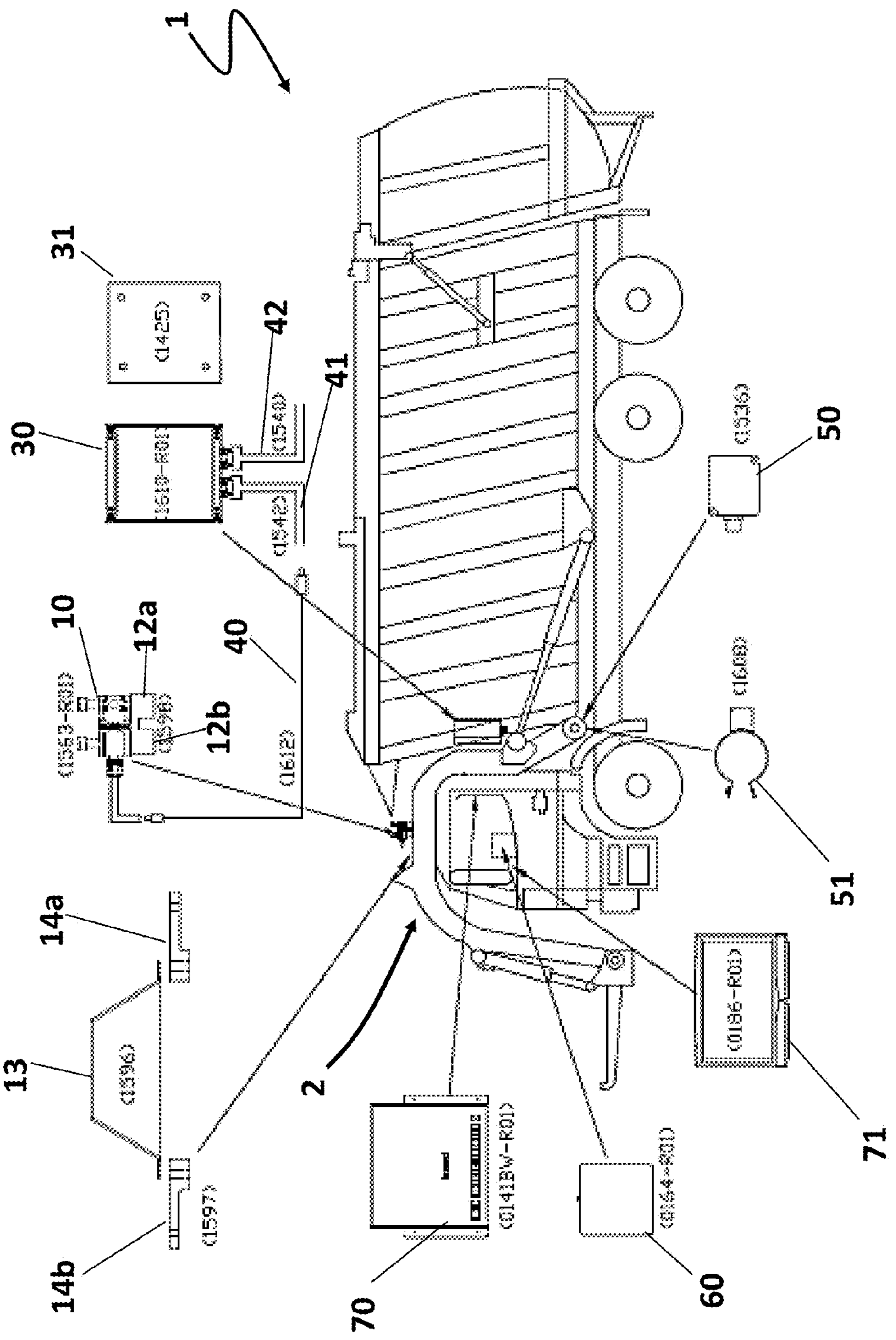
FIG. 1 is a schematic view of a waste-hauling FEL vehicle according to an exemplary embodiment of the present invention.

Referring now to the drawings, wherein like numerals refer to like or corresponding parts throughout the several views, there is disclosed herein a weighing system for FEL-type waste-hauling vehicles, along with a method of installing a weighing device on one or more arms of such a waste-hauling vehicle.

With particular reference to FIG. 1, the weighing system may be seen to comprehend, in the exemplary embodiment, some or all of the following components disposed on an otherwise conventional FEL-type waste-hauling vehicle 1:

At least one extensometer 10 is mounted on at least one FEL arm 2 of the vehicle 1, the relatively moveable extensometer halves each secured to separate extensometer mounts 12*a*, 12*b* so that the extensometer 10 is operative to detect deflections in the arm 2 in response to loads of varying weights being supported thereby. In one embodiment, an extensometer 10 is mounted to the arm 2 via the method described further below, although it will be appreciated that other methods may be employed. A cover 13 is disposed over the extensometer 10, the cover 13 secured to the arm 2 via cover mounts 14*a*, 14*b*.

It will be appreciated at least one an extensometer 10 may be mounted in substantially the same location on each FEL arm 2 or, alternatively, that only a single extensometer 10 may be employed on only a single one of the arms 2. The provision of at least two such extensometers 10 (i.e., at least one on each arm) will provide the weighing system with greater accuracy in determining weights as described below. However, and on the assumption that the configuration of the waste container and FEL arms are such that the load is relatively evenly distributed between the FEL arms 2, it will be appreciated from this disclosure that the provision of an extensometer 10 on only one of the FEL arms 2 is one possible embodiment of the present invention; subject, of course, to the system as described herein being modified to take into account the fact that the inputs from the single extensometer 10 reflect only half of the actual load (e.g., that the system is calibrated to double the measured load).

A vehicle data hub ("VDH") 30 is in communication with each of the one or more extensometers 10 (such as, for instance, via cables 40). The VDH 30 is mounted, for instance, between the cab and waste receptacle (e.g., the dump body) of the waste hauling vehicle 1, such as via a bracket 31. The VDH weighs a waste container on the "UP" cycle and again on the "DOWN" cycle of the lift; that is, the cycle of the FEL arms from the point of raising the waste container to dump into the vehicle dump body and back again to the point of lowering the waste container to the ground. More specifically, the VDH 30, which comprises a weighing board, is operative to receive inputs from the extensometers 10 and determine therefrom: (i) the weight of a waste container holding waste as that waste container is lifted by the FEL arms for emptying into a waste receptacle (e.g., dump body) on the vehicle; (ii) the weight of the waste container as it is lowered by the FEL arms after the waste container has been emptied into the waste receptacle (e.g., dump body) on the vehicle; and (iii) the net weight of the waste that was contained in the container. More specifically, the extensometer creates a differential signal that is fed to an analog to digital converter ("ADC"). The voltage across the differential signal is proportional to the extension on the device. The signal is sampled at a regular interval during the lift operation and the average ADC code value is calculated for the up and the down direction of FEL movement. The up and down weight for the waste container are calculated from the calculated code values using a linear function.

The net weight information so calculated is applied to the lift; that is, the net weight data is associated, in a computer database, with the lift event from which the net weight was determined. This information is displayed on the optional in-cab display unit 60 (discussed below) and is, moreover, communicated by the VDH 30 to the optional on-board computer 70 (discussed below) and/or to a remote location (such as, for instance, the waste-hauling vehicle's dispatch center, central office, etc.). According to the exemplary embodiment, the VDH 30 provides integrated general packet radio service ("GPRS"), GPS and WiFi, and RFID reading, as well as the ability to handle I/O signals. The VDH 30 is optionally capable of collecting and managing RFID, weight data, GPS coordinates and CANBus data through one single unit with, per the exemplary embodiment, greatly simplified wiring and installation. These data, or any of them, can then be relayed back, via the VDH's integral modem, in real time, to a remote location (such as the vehicle's dispatch center, central office, etc.) to be analyzed and used to track vehicle performance and location, and for invoicing and performance reporting. The VDH 30 is, optionally, a modular system available in a variety of configurations. A basic unit provides GPS tracking with GPRS communication, while multiple weighing and RFID reader modules can be added as required. Further, the VDH 30 can optionally be used in conjunction with an on-board computer 70 to provide driver interaction.

Optionally, a positional, or "tilt", sensor 50 may be disposed on at least one FEL arm 2 of the vehicle 1. The tilt sensor 50 is mounted on a cross-tube clamp 51 secured to the FEL arms' common cross-tube, although those skilled in the art will appreciate that other mounting arrangements are possible. The tilt sensor 50 is in communication with the VDH 30 (such, as, for instance, via wiring coupled to the tilt harness 41). The tilt sensor 50 is operative to measure the angular position of the at least one FEL arm 2 through its range of motion; and the VDH 30 receives inputs from the tilt sensor 50 and determines therefrom the height of the at least one FEL arm 2 through its range of motion. By these inputs from tilt sensor 50, the VDH is operative to determine individual lift cycles and dynamic weighing windows.

Optionally, a display box 60 is provided in the cab of the waste-hauling vehicle 1 to display the weight of the waste container currently being weighed (as determined by the VDH 30 via inputs from the extensometer 10). Display 60 may, as in the exemplary embodiment, comprise a four-line LCD display and one or more LED lights indicating the status of the current lifting cycle. However, it will be appreciated that the particular type of display may be selected according to user desire.

Optionally, an on-board computer 70 is provided in the cab of the vehicle 1. The on-board computer comprises, per the exemplary embodiment, an embedded, fanless PC with a solid state drive, a cab-mounted, touch-screen driver interface 71, a GPRS modem and antenna, and a GPS receiver. Via the GPS receiver, the on-board computer may also be operative to determine the GPS location of the vehicle 1 at any given location and, thus, to associate the determined GPS location with each lift cycle of the FEL arms.

By the foregoing, the weighing system of the present disclosure is operative to weigh a waste container on the way "UP" and on the way "DOWN" during a lift cycle; the net weight is automatically calculated by the VDH (using inputs from the extensometer or extensometers) and displayed in the cab for the driver. The foregoing weighing function takes place in dynamic mode; that is, no static pause during the lift cycle of the FEL arms is needed to weigh the waste container.

As noted, the weighing system of the present invention is preferably (though not necessarily) programmed to work automatically with no need for driver input. Where, moreover, the optional on-board computer 70 is provided, data (including at least the determined net weight and, optionally, the GPS location of the vehicle where the net weight is determined) can also be sent wirelessly to a remote location (such as, for instance, the vehicle's dispatch center, central office, etc.).

Figure 2:
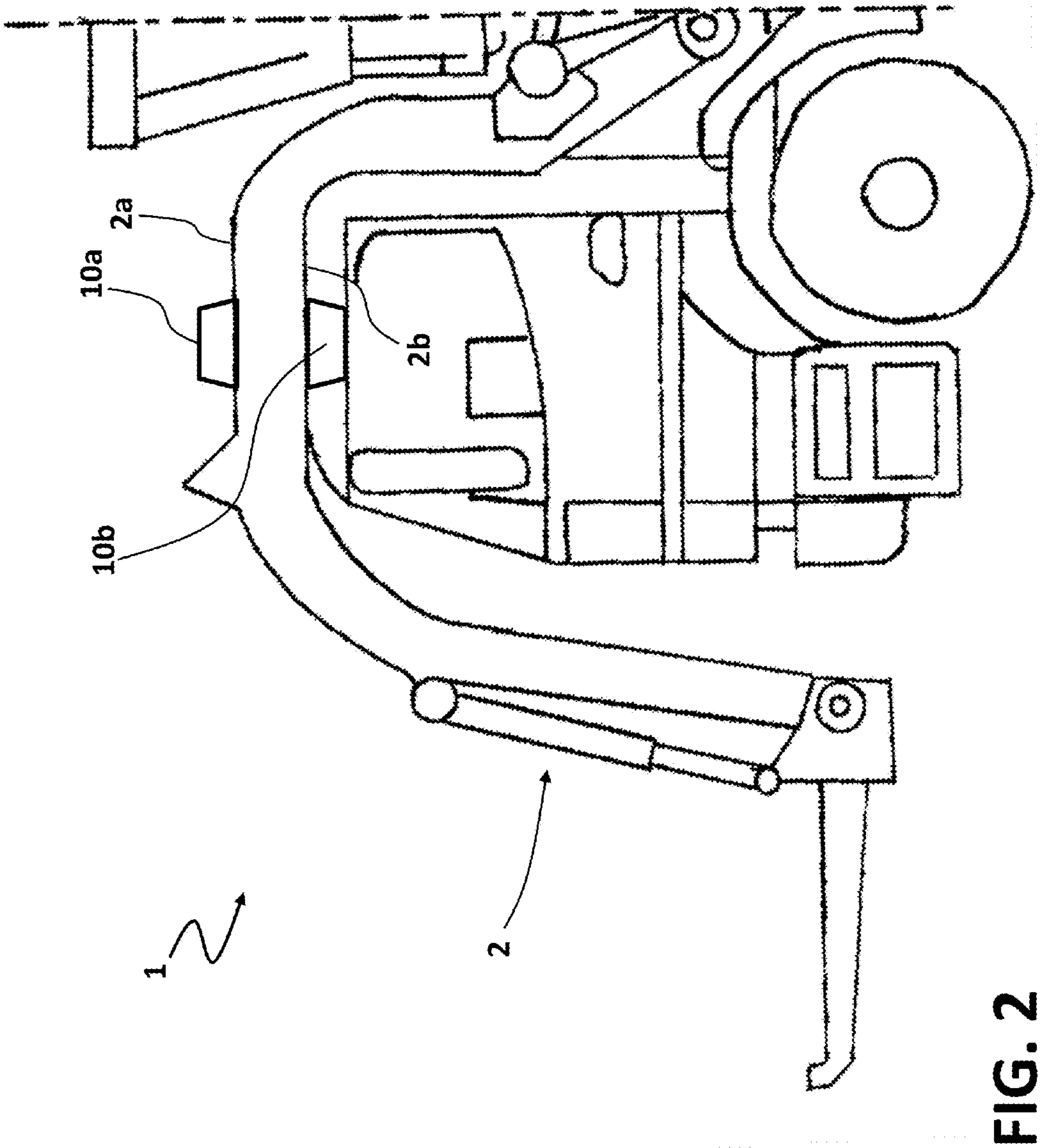
FIG. 2 is a detailed view of a waste-hauling FEL vehicle depicting one embodiment of the present invention in which extensometers are oppositely mounted on opposite surfaces of an FEL arm.

According to an alternative embodiment of the weighing system, two extensometers 10*a*, 10*b* are mounted generally opposite each other on upper 2*a* and lower 2*b* surfaces of at least one of the FEL arms 2, as shown in FIG. 2.

When an FEL arm 2 is loaded, it deflects or bends in proportion to the load applied. The upper surface 2*a* is extended, while the lower surface 2*b* is compressed by an equivalent amount. As will be appreciated, the above-described embodiments of the present invention—i.e., where the extensometer(s) 10 is/are mounted only on the upper surface 2*a* of the FEL arm(s) 2—take into account the extension of the arm(s) 2*b*. According to the alternative embodiment of FIG. 2, both extension and compression are taken into account. The added benefit of this embodiment may be understood from the following formulae, in which "U" represents the signal output from the extensometer 10*a* mounted on the upper surface 2*a*, and "L" is the signal output from the extensometer 10*b* mounted on the lower surface 2*b:*

$$(U-L)=0; \text{ and}$$

$$(U-(-L))=U+L$$

"(U−L)" represents calibration of the system (e.g., the VDH) for zero load applied to the FEL arm(s) 2 so that the difference between the output of the upper 10*a* and lower 10*b* extensometers is 0. Upon the application of a load to the FEL arm(s) 2, the signal U from the upper 10*a* extensometer has a first "polarity" (e.g., positive) because it is in tension, whereas the signal L from the lower extensometer 10*b* has the opposite "polarity" (e.g., negative) because it is in compression. In consequence, it will be appreciated that the difference between these two signals (U and L) is actually additive—i.e., (U−(−L))=U+L—such that the signal is doubled and, hence, the sensitivity of the measurement calculated by the system (e.g., the VDH) is increased in this embodiment of the invention.

A still further benefit from the foregoing embodiment of the present invention is the automatic correction for common mode offsets. For instance, it is the case that where only a single extensometer is employed on a surface of the FEL arm, an increase in ambient temperature causes the FEL arm 2 to expand, making it difficult to distinguish between the effects of an increase in load versus those of the temperature increase. Because a temperature increase will cause the FEL arm(s) to expand proportionally along both of the upper 2*a* and lower 2*b* surfaces thereof, the difference between the two signals (i.e., U−L) will effectively cancel out the temperature-induced offset, leaving only the deflection due to the applied load in the difference calculation. In other words, the disposition of extensometers 10*a*, 10*b* on opposite surfaces of an FEL arm automatically negates the otherwise distorting effects the temperature increase would have on an extensometer applied to only one (upper or lower) surface of the FEL arm.

Figure 3:
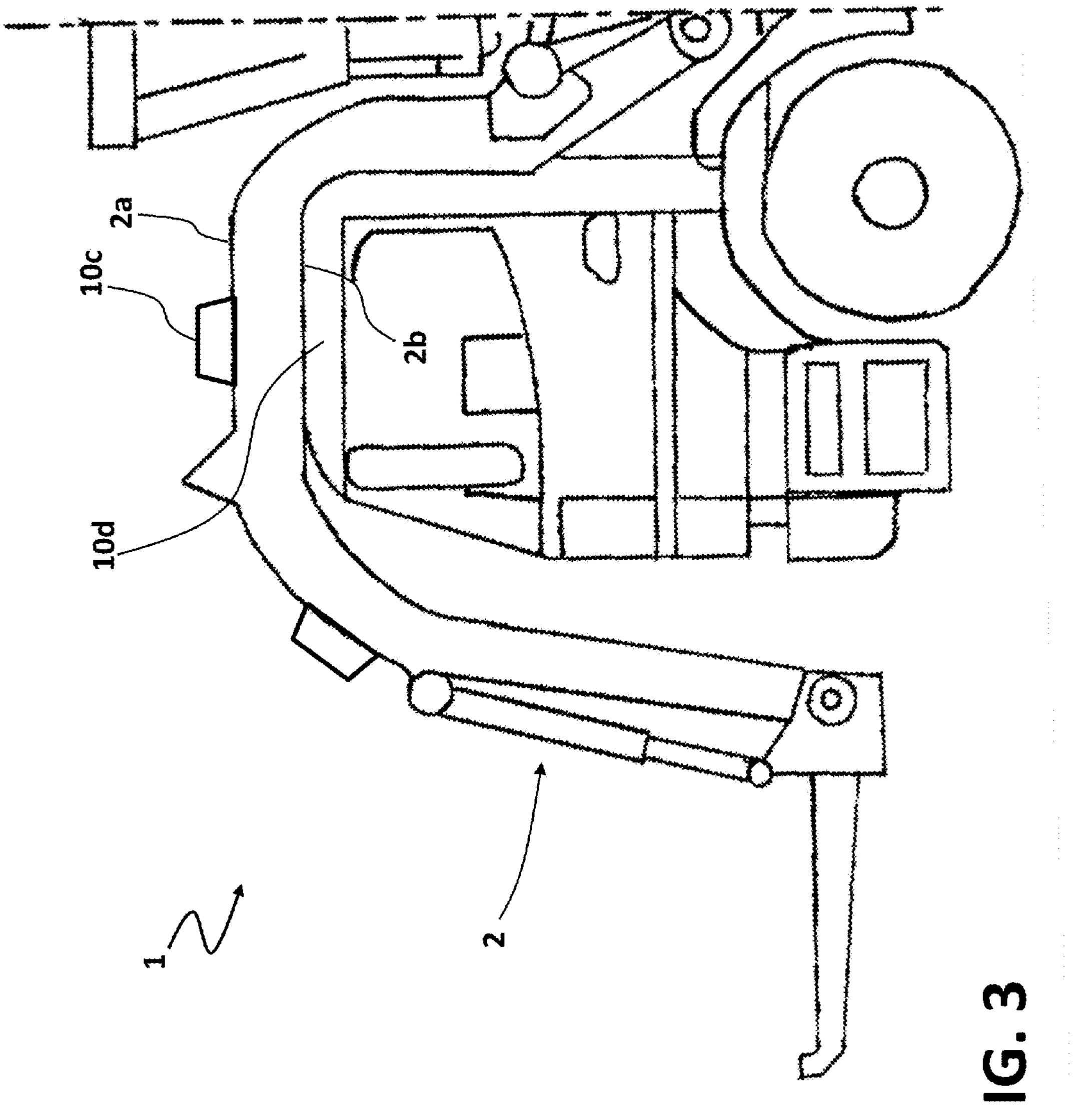
FIG. 3 is a detailed view of a waste-hauling FEL vehicle depicting another embodiment of the present invention in which extensometers are mounted in longitudinally spaced-apart relation along the same surface of an FEL arm.
Figure 4:
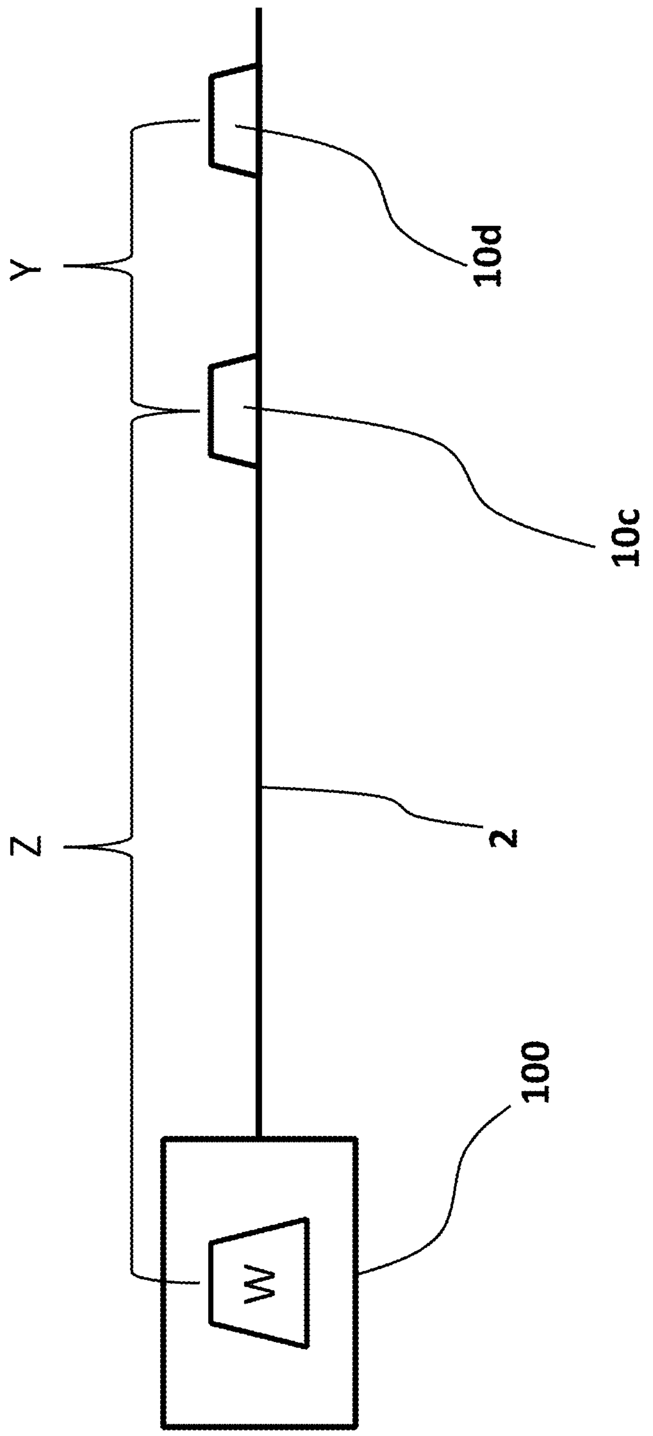
FIG. 4 is diagrammatic depiction of the principle of operation of the embodiments of FIGS. 3 and 5.
Figure 5:
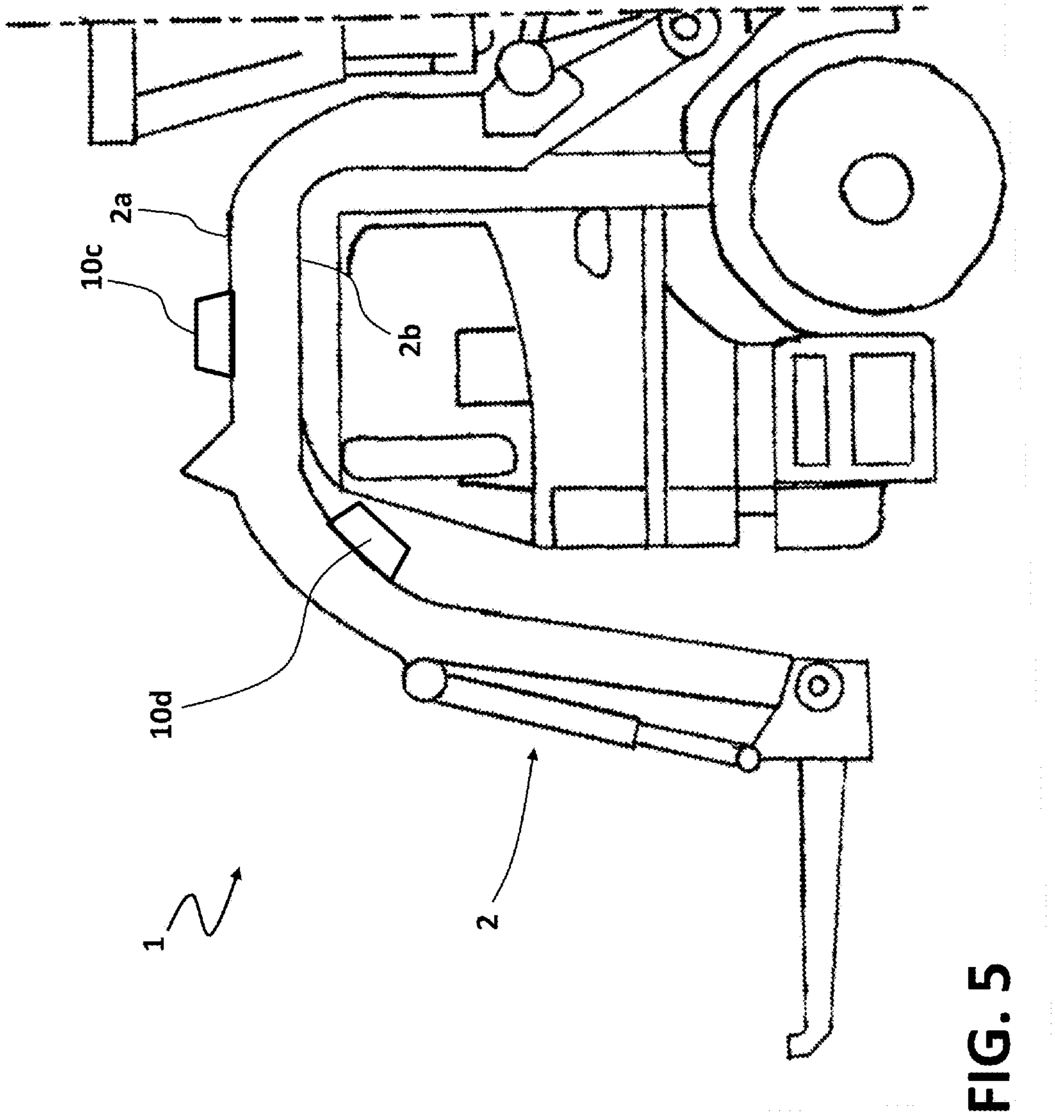
FIG. 5 is a detailed view of a waste-hauling FEL vehicle depicting another embodiment of the present invention in which extensometers are mounted in longitudinally spaced-apart relation along opposite surfaces of an FEL arm.

According to a still further embodiment of the present invention, shown in FIGS. 3 through 5, two extensometers 10*c*, 10*d* are mounted in longitudinally spaced-apart locations on the same FEL arm 2. As shown, those spaced-apart locations may be on either the same surface (e.g., the upper surface 2*a*, as shown in FIG. 3) or on different surfaces (i.e., the upper 2*a* and lower 2*b* surfaces, as shown in FIG. 4).

Where only a single extensometer is employed (on one or both FEL arms), such as in the embodiment of FIG. 1, it will be appreciated that the weight of the waste container creates a moment of force that is calculated as the weight by the equivalent distance from the extensometer to the center of gravity of the waste container. This is, in effect, the law of the lever. If the position of the load in the waste container is moved from one location of the waste container to another location, the distance between the center of gravity of the load and the extensometer is changed, resulting in a different moment of force measured by the extensometer. The result is that this movement can create a different apparent weight when, in fact, it is only the position of the load that has changed. By providing two extensometers 10_c_, 10_d_ in longitudinally spaced-apart relation a fixed, known distance apart along the same FEL arm 2, shifts in the position of the load within the waste container can be negated. With particular reference to FIG. 4, the foregoing may be appreciated from the following formulae, where "W" represents the load in the waste container 100, "Z" represents the (variable) distance from the load to the nearest extensometer 10_c_, and "Y" represents the fixed distance between the first 10_c_ and second 10_d_ extensometers:

$$W\times(Z)=WZ;$$

$$W\times(Z+Y)=WZ+WY; \text{ and}$$

$$(WZ+WY)-(WZ)=WY$$

The signal generated by the measurement of the extensometer 10_c_ nearest the load W is proportional to the moment of force, represented as W×(Z)=WZ; the signal generated by the measurement of the extensometer 10_d_ further from the load W is proportional to the moment of force, represented as W×(Z+Y)=WZ+WY.

When the first signal is subtracted from the second signal, the resulting output may be represented as (WZ+WY)−(WZ)=WY. Since Y is a fixed distance, this resulting output is independent of the location of the load W in the waste container 13. Accordingly, shifting in the position of the load W within the waste container may be canceled out of the weight determination made in the system of the present invention.

Referring now to FIGS. 6 through 10, the method of mounting each at least one extensometer 10 to an FEL arm 2 of a vehicle will be more particularly described. The following exemplary method is described in respect of placement of an extensometer on a single FEL arm of a waste-hauling vehicle; however, it is contemplated that the present invention may employ extensometers mounted to each of the pair of FEL arms comprising a conventional FEL-type waste-hauling vehicle. Further, it will be appreciated that the extensometer(s) may be mounted other than as described herebelow; and, conversely, that the extensometer mounting method may be used to mount one or more extensometers for use in a weighing system other than as described herein.

First, there is provided a positioning jig 11 having a principal length extending between first 11_a_ and second 11_b_ ends, the first end 11_a_ defining a frame of reference for orienting the jig on the FEL arm. In the illustrated embodiment, the first end 11_a_ more particularly defines an end-plate oriented generally orthogonal to the principal length. The jig 11 has removably connected thereto by bolts 15 (or other selectively removable fastening means) along the principal length each of an unitary mount 12 for the extensometer 10 and a pair of mounts 14_a_, 14_b_ for a cover 13. As will be appreciated from the drawings, the configuration of the positioning jig 11 ensures proper relative spacing along the FEL arm 2 of the cover mounts 14_a_, 14_b_ and the unitary extensometer mount 12, as well as the proper alignment of their respective bottom surfaces along a desired plane (such as a common plane) to ensure accurate placement of these various mounts 12, 12_a_, 14_b_ on the surface of the FEL arm 2.

Figure 6:
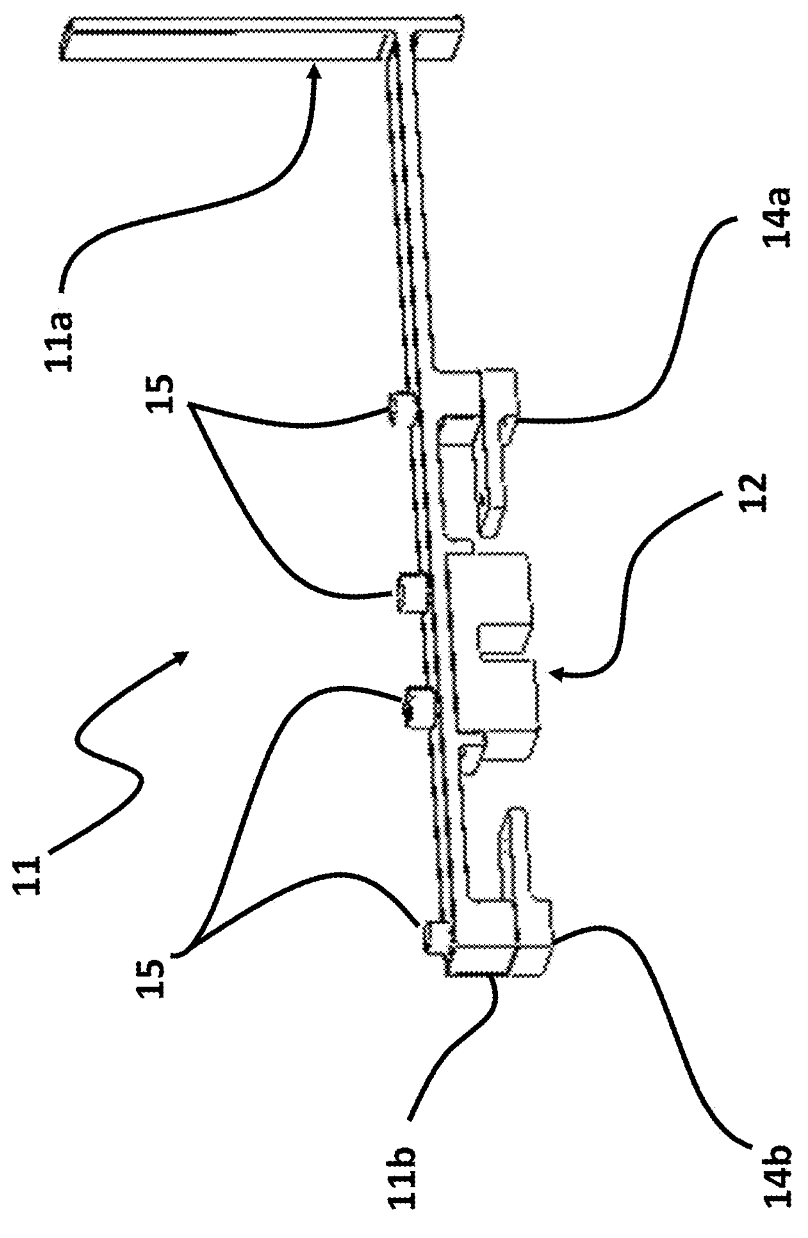
FIG. 6 is a perspective view of the jig employed to position the extensometer and related elements on the FEL arm of a waste-hauling vehicle.
Figure 7:
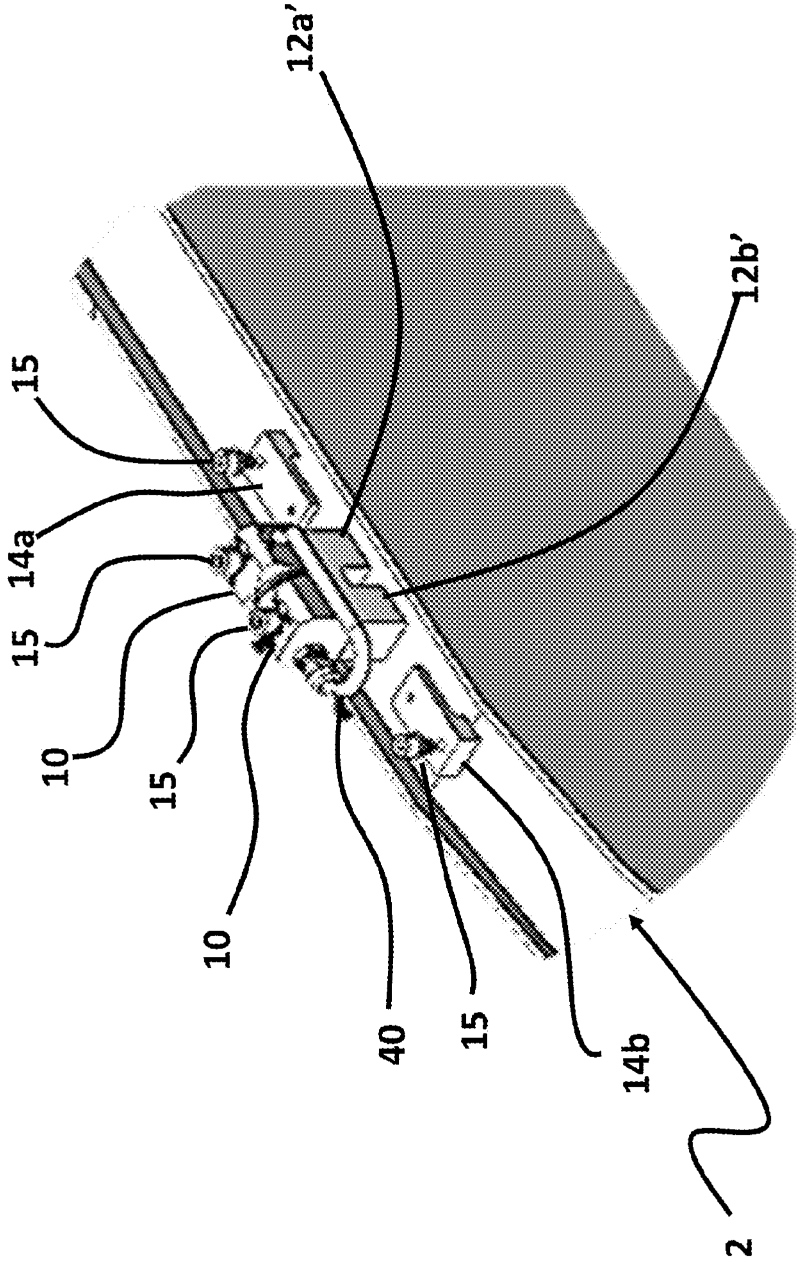
FIG. 7 is a detailed perspective view of the extensometer mounted on the FEL arm of a waste-hauling vehicle, with the extensometer cover removed.
Figure 8:
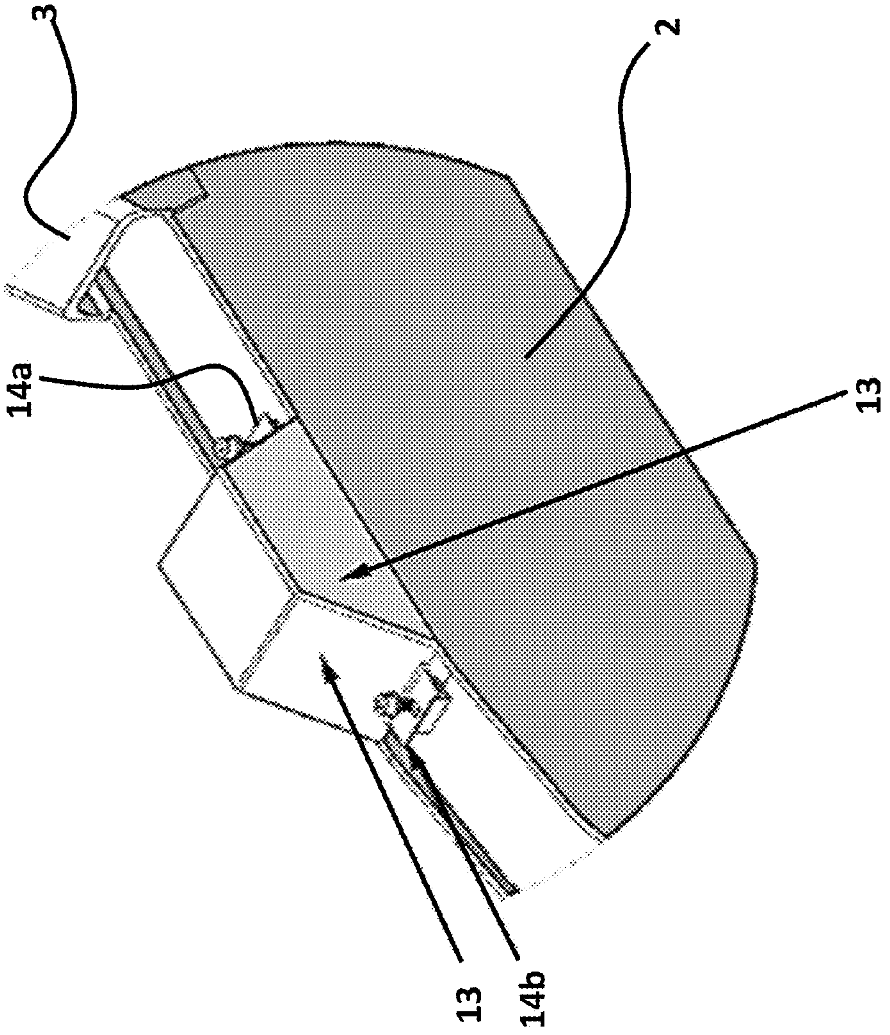
FIG. 8 is a detailed perspective view of the extensometer mounted on the FEL arm of a waste-hauling vehicle, with the extensometer cover in place over the extensometer.

As shown best in FIG. 6, the unitary extensometer mount 12 comprises first 12_a_ and second 12_b_ portions each having a first thickness, the first and second portions being spaced apart from each other by an intermediate portion 12_c_ having a second thickness that is less than the first thickness. The intermediate portion 12_c_ is positioned between the first 12_a_ and second 12_b_ portions so as to leave a gap G beneath the intermediate portion 12_c_ and between the first 12_a_ and second 12_b_ portions. However, those skilled in the art will appreciate that the particular configuration of extensometer mount 12 depicted in the exemplary embodiment is not intended to be limiting of the claimed invention.

Figure 9:
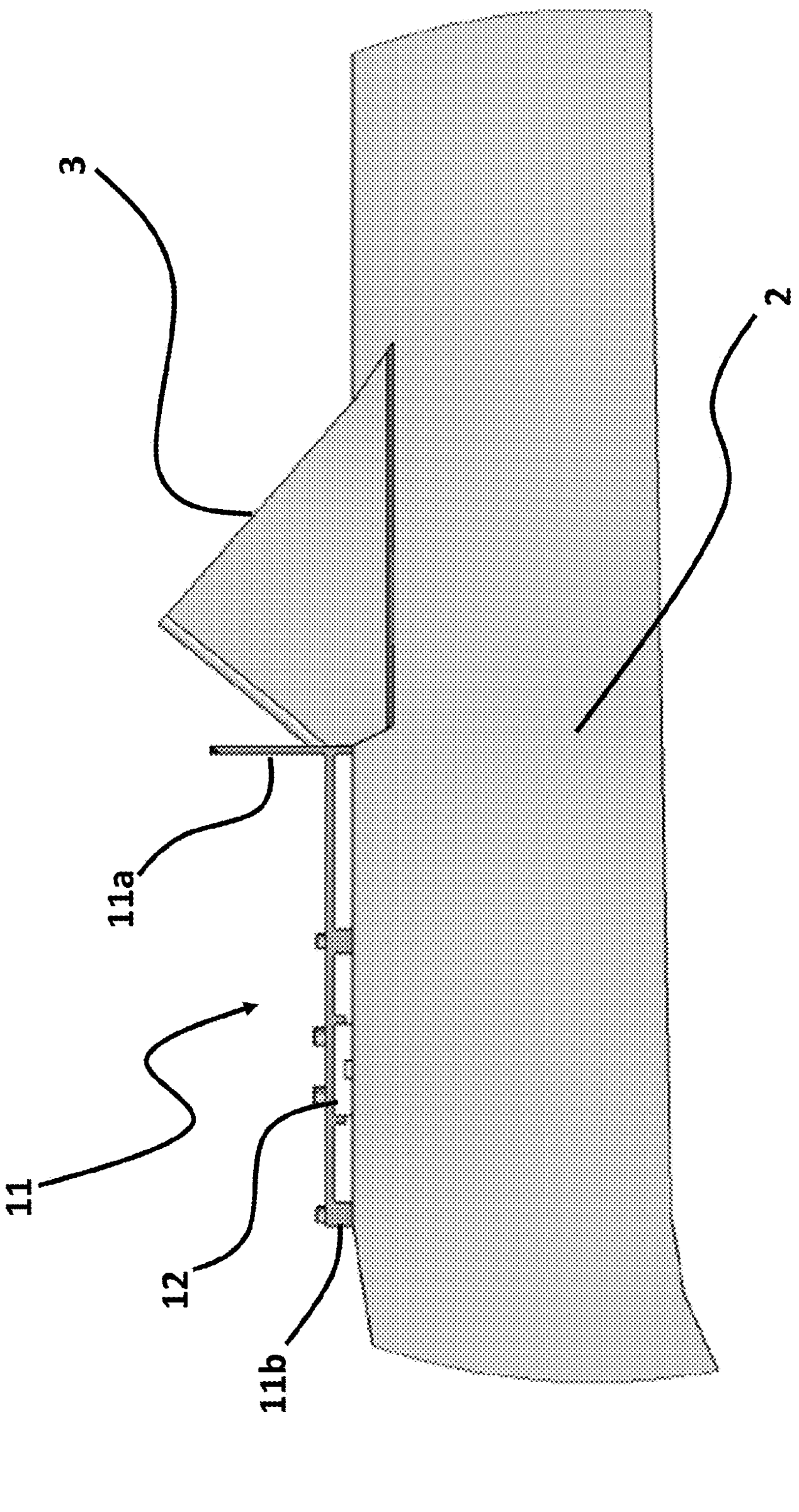
FIG. 9 is a lateral view of the positioning jig in position on the FEL arm of a waste-hauling vehicle of the type including a dump-position stop plate.
Figure 10:
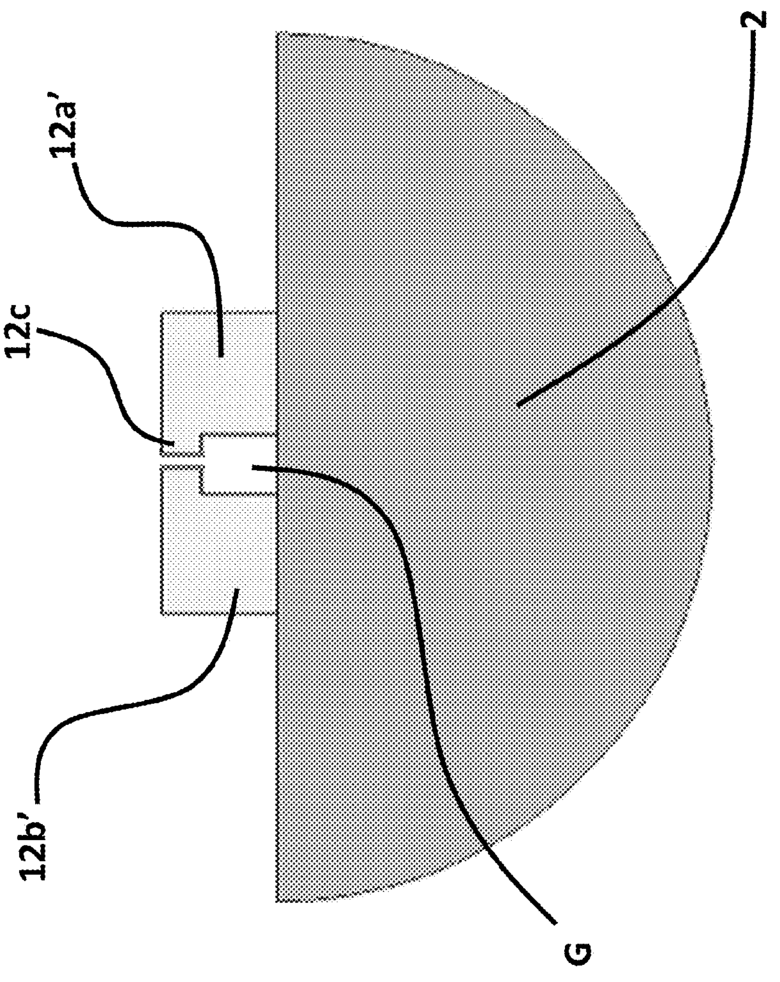
FIG. 10 is a detailed lateral view of the cut extensometer mount in position on the FEL arm of a waste-hauling vehicle.

In a first step, the jig 11 is placed on the arm 2 so that the first end 11_a_ is positioned in a predefined location relative to a known location on the FEL arm. Where, for instance, the FEL arm 2 is of the type that includes a dump position stop-plate 3, such as shown in FIG. 9, the jig 11 is positioned so that the first-end 11_a_ end-plate abuts the dump position stop-plate 3. Where, in another example, the FEL arm 2 is of the type that does not include a dump position stop-plate but does include a plug weld hole proximate a stopper buffer area of the arm 2, the first step comprises placing the jig 11 so that the first end 11_a_ is positioned a predefined distance from the plug weld hole. In either case, the configuration of the positioning jig 11 and its placement relative to the defined locations on each FEL arm ensures proper positioning on the FEL arm of each of the a unitary mount 12 for the extensometer 10 and the cover mounts 14_a_, 14_b_.

Next, the cover mounts 14_a_, 14_b_ and the unitary extensometer mount 12 are secured to the arm 2 while the positioning jig 11 is maintained in its proper position as heretofore defined. In the exemplary embodiment, this is first, provisionally accomplished by tack welding. Following disconnection of the positioning jig 11, the cover mounts 14_a_, 14_b_ and the unitary extensometer mount 12 are more securely welded in place.

In a subsequent step, the positioning jig 11 is disconnected (i.e., by removing bolts 15) from each of the cover mounts 14_a_, 14_b_ and the unitary extensometer mount 12. As indicated, the mounts 12, 14_a_, 14_b_ are then securely welded in place.

Next, the unitary extensometer mount 12 is cut to define two completely separate extensometer mounts 12_a_', 12_b_'. In the exemplary embodiment, this step more particularly comprises cutting the intermediate portion 12_c_ of the unitary extensometer mount 12 so that there is an approximately 10 cm gap between the separate extensometer mounts 12_a_', 12_b_' defined by the cut.

The extensometer 10—which, per convention, is comprised of two portions (each labeled 10) that are moveable relative to each other—is in a subsequent step secured to the separate extensometer mounts 12_a_', 12_b_' (using the bolts 15 provided to secure the unitary extensometer mount 12 to the jig 11). It will be appreciated by those skilled in the art that such separate mounting as provided by the extensometer mounts 12_a_', 12_b_' is necessary so that the extensometer 10 is able to detect deflections in the arm 2 in response to loads of varying weights.

Finally, a cover 13 is positioned over the extensometer 10 and connected to each of the cover mounts 14_a_, 14_b_ using the bolts 15 provided to secure the cover mounts 14_a_, 14_b_ to the jig 11.

Although other mounting locations for the extensometer 10 on each FEL arm are possible, the extensometer 10 is, according to the exemplary embodiment herein described, positioned on a portion of each FEL arm 2 which is characterized as being substantially horizontally oriented when the FEL arm 2 is in a fully lowered position relative to the waste-hauling vehicle 1.

Figure 11:
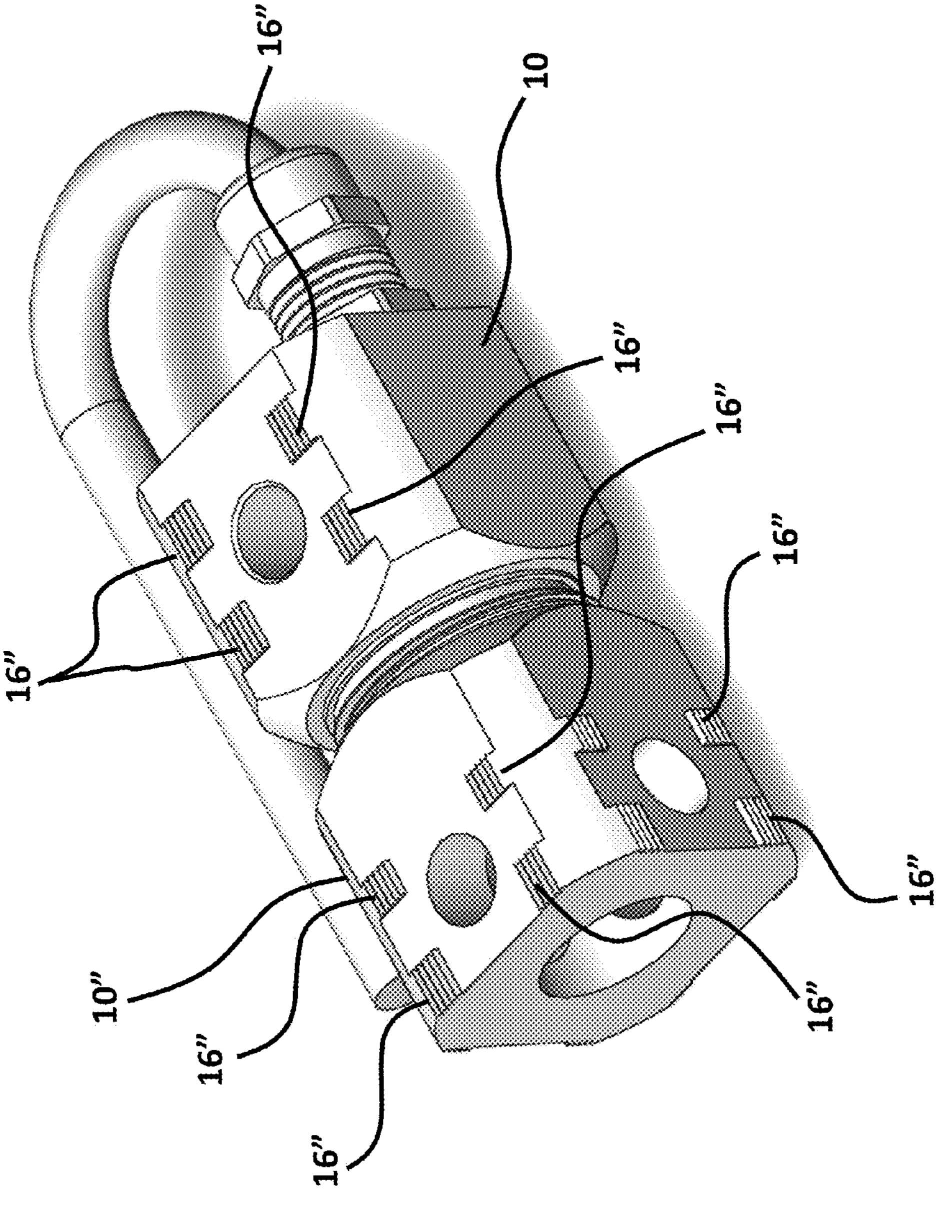
FIG. 11 is a perspective view of an alternative embodiment of the extensometer.

According to one optional variation of the foregoing invention, shown in FIG. 11, either of (i) the two portions of the extensometer 10" or (ii) the associated extensometer mounts 12*a*, 12*b* (not depicted in FIG. 11) are fashioned from a relatively harder material than the material used to fashion the other. The one of the extensometer 10" (in the embodiment of FIG. 11 it will be appreciated to be the extensometer) or its associated mounts 12*a*, 12*b* fashioned from the harder material is provided with one or more projections 16", such as teeth, splines, ridges, etc. which extend outwardly from the mounting surface so as to face the other of the extensometer or its mount. During the step in which the extensometer 10" portions are secured to the separate mounts 12*a*, 12*b*, the one or more projections will, under suitable force, create corresponding recesses in the softer material of the other of the extensometer or its mount. These will uniquely register the portions of the extensometer 10" and mounts 12*a*, 12*b* in a zero-tolerance relationship, such that any movement in one of the extensometer portions or the mounts will be completely transferred between them. As will be appreciated, the foregoing optional variation precludes relative slippage between an extensometer and its associated mounts, which slippage would otherwise potentially interfere with the weight determination as such slippage consumes motion that would otherwise be sensed by the extensometer.

Pursuant to another optional variation of the present invention, which may be used in the alternative or in addition to the foregoing, one or more washers (such as, by way of example, NORD-LOCK washers) are provided between each extensometer and the bolts 15 when securing the extensometer 10 to mounts 12*a*', 12*b*'. Alternatively, or in addition, a suitable thread-locking adhesive is applied to the threads of the bolts 15 so as to securely fix the bolts—and, relatedly, the extensometer—to mounts 12*a*', 12*b*'. Either or both of the foregoing options serve to prevent the bolts 15 from subsequently loosening due to vibration or shock encountered during operation of the vehicle. Because such loosening of the bolts 15 changes the torque initially applied to the extensometer 10 during installation (which initial torque is calibrated out of the weighing system so that it does not impact weight calculations), it results in a loss of calibration of the weighing system. Accordingly, the foregoing options each serve to preserve the initial calibration of the system.

It will be appreciated from the foregoing description that the present invention is readily retrofitted to any FEL-type waste-hauling vehicle, and that no modification to the FEL arms is required. Moreover, the present inventive weighing system provides not only accurate weight information but, optionally, a GPS location for each lift, as well as optional automatic data transfer to the vehicle's dispatch center or other desired, remote location. By the foregoing, the weighing system of the present disclosure provides numerous benefits, including, without limitation, assisting commercial waste haulers in the identification of profitable accounts, service activity, etc., thereby increasing the efficiency and accountability of commercial waste collections. Still further, the weighing system is robust, requiring virtually no maintenance, while calibration is carried out only at the time of system installation. As the weighing system doesn't rely on load cells, it is more reliable than conventional weighing solutions and, moreover, presents a low risk for damage.

Although preferred embodiments of the invention have been disclosed herein for illustration, it should be understood that various changes, modifications, and substitutions may be incorporated in such embodiment without departing from the spirit of the invention as defined by the claims which follow.

The invention in which an exclusive property or privilege is claimed is defined as follows:

1. A weighing system for a waste-hauling vehicle having a front end loader comprising at least two arms for lifting a waste container, the weighing system comprising: at least one extensometer mounted on at least one arm of the front end loader, the extensometer secured to separate extensometer mounts so that the at least one extensometer is operative to detect deflections in the front end loader arm in response to loads of varying weights; and a vehicle data hub in communication with the extensometer, the vehicle data hub operative to receive inputs from the extensometer and determine therefrom: (i) the weight of a waste container containing waste as the waste container is lifted by the front end loader for emptying into a waste receptacle on the vehicle; (ii) the weight of the waste container as it is lowered by the front end loader after the waste container has been emptied into the waste receptacle on the vehicle; and (iii) the net weight of the waste that was contained in the container.

2. The weighing system of claim 1, further comprising: a tilt sensor disposed on at least one arm of the front end loader, the tilt sensor in communication with the vehicle data hub, and the tilt sensor operative to measure the angular position of the at least one arm of the front loader through its range of motion; and wherein the vehicle data hub is operative to receive inputs from the tilt sensor and determine therefrom the height of the at least one arm of the front loader through its range of motion.

3. The weighing system of claim 1, further comprising a GPS receiver, and a computer operative to determine a GPS location for the vehicle and to create a record comprising at least the net weight of the waste that was contained in the container as determined by the vehicle data hub, as well as the GPS location of the waste-hauling vehicle determined for the location at which the net weight determination was made.

4. The weighing system of claim 1, wherein at least one extensometer is mounted on each of the at least two arms of the front end loader, each extensometer secured to separate extensometer mounts so that each extensometer is operative to detect deflections in each front end loader arm in response to loads of varying weights.

5. The weighing system of claim 1, wherein two extensometers are mounted opposite each other on upper and lower surfaces of the same at least one arm of the front end loader, each extensometer secured to separate extensometer mounts so that each extensometer is operative to detect deflections in the front end loader arm in response to loads of varying weights.

6. The weighing system of claim 1, wherein two extensometers are mounted in longitudinally spaced-apart locations on the same at least one arm of the front end loader, each extensometer secured to separate extensometer mounts so that each extensometer is operative to detect deflections in the front end loader arm in response to loads of varying weights.

7. A method for mounting at least one extensometer on a waste-hauling vehicle of the type having a front end loader comprising at least two arms for lifting a waste container, the method comprising the steps of:

providing at least one extensometer;

providing a positioning jig having a principal length extending between first and second ends, the first end defining a frame of reference for orienting the jig on the arm of the front end loader, and the jig having removably connected thereto along the principal length each of a unitary mount for an extensometer and a pair of mounts for a cover;

placing the jig on the arm of the front end loader so that the first end is positioned in a predefined location relative to a known location on the front end loader arm;

securing the cover mounts and the unitary extensometer mount to the front end loader arm; disconnecting the positioning jig from each of the cover mounts and the unitary extensometer mount;

cutting the unitary extensometer mount to define two completely separate extensometer mounts;

securing an extensometer to the separate extensometer mounts so that the extensometer is operative to detect deflections in the front end loader arm in response to loads of varying weights; and positioning a cover over the extensometer and connecting the cover to each of the cover mounts.

8. The method of claim 7, wherein the first end of the jig comprises an end plate, wherein each front end loader arm includes a dump position stop-plate, and wherein the step of placing the jig on the arm of a front end loader so that the first end is positioned in a predefined location relative to a known location on the front end loader arm comprises placing the jig so that the first-end end-plate abuts the dump position stop-plate.

9. The method of claim 7, wherein each front end loader arm includes a plug weld hole proximate a stopper buffer area of the front end loader arm, and wherein the step of placing the jig on the arm of a front end loader so that the first end is positioned in a predefined location relative to a known location on the front end loader arm comprises placing the jig so that the first end is positioned a predefined distance from the plug weld hole.

10. The method of claim 7, wherein the step of cutting the unitary extensometer mount to define two completely separate extensometer mounts comprises cutting the unitary extensometer mount so that there is an approximately 10 cm gap between the separate extensometer mounts.

11. The method of claim 7, wherein the unitary extensometer mount comprises first and second portions each having a first thickness, the first and second portions being spaced apart from each other by an intermediate portion having a second thickness that is less than the first thickness, the intermediate portion being positioned between the first and second portions so as to leave a gap beneath the intermediate portion and between the first and second portions.

12. The method of claim 11, wherein the step of cutting the unitary extensometer mount to define two completely separate extensometer mounts comprises cutting the intermediate portion so that there is an approximately 10 cm gap between the separate extensometer mounts.

13. The method of claim 7, wherein the extensometer is positioned on a portion of the front end loader arm which is characterized as being substantially horizontally oriented when the front end loader arm is in a lowered position relative to the vehicle.

14. The weighing system of claim 1, wherein one of the extensometer or the extensometer mounts comprises a mounting surface of a first material, and the other of the extensometer or the extensometer mounts includes one or more projections of a second material having a hardness greater than the hardness than the first material, such that, when the extensometer is secured to the extensometer mounts with sufficient force, the projections create corresponding indentations in the first material to register the extensometer and the extensometer mounts in a zero tolerance relationship.

15. The weighing system of claim 1, wherein the extensometer is secured to the extensometer mounts via threaded fasteners, and wherein further one or more washers are provided between the extensometer and the threaded fasteners.

16. The weighing system of claim 15, wherein the one or more washers are NORD-LOCK washers.

17. The weighing system of claim 1, wherein the extensometer is secured to the extensometer mounts via threaded fasteners, and wherein further a thread locking adhesive is applied to the threaded fasteners.

* * * * *